Feb. 28, 1928.

M. E. BERLOWITZ 1,660,986

GAUGE

Filed Sept. 19, 1923

Inventor:
Max E. Berlowitz.
By
his Attorney.

Patented Feb. 28, 1928.

1,660,986

UNITED STATES PATENT OFFICE.

MAX E. BERLOWITZ, OF BELLEVILLE, NEW JERSEY, ASSIGNOR TO GENERAL MOTORS CORPORATION, OF DETROIT, MICHIGAN, A CORPORATION OF DELAWARE.

GAUGE.

Application filed September 19, 1923. Serial No. 663,567.

This invention relates to gauges and is herein shown as embodied in an internal diameter gauge for testing tubes and the like.

When grinding sleeves, tubes or race rings for roller bearings and the like, it is customary, at intervals during the process of grinding, for the operator to remove the grinder from the interior of the work and insert a measuring instrument to indicate how far the operation has proceeded. Sometimes a solid plug of the correct size is slipped into the piece of work to test it, and sometimes a comparator gauge having an indicator is used. A solid plug does not give an accurate idea of the amount of material that must be removed and the indicator gauges heretofore used have not been easy or quick to manipulate. Furthermore, indicators are usually sensitive to small differences in size so that, between successive grindings, the indicator needle is apt to make a complete revolution or more, resulting in an overgrinding by an amount equivalent to one revolution of the needle and this is not detected by the operator. Prior gauges have not been sufficiently accurate because the instruments do not readily align themselves with the axes of the tubes or sleeves being tested.

One of the objects of the invention, therefore, is to provide an accurate gauge which can be quickly manipulated. Another object is to provide a gauge which will detect any over-grinding before further grinding is attempted. In the construction which is selected for illustration, the gauge comprises a housing, one end of which is inserted in the tube to be tested and carries a gauge pin movable into contact with the work, and the other end of which carries an indicator with a trigger for sliding the gauge pin to enable the instrument to be inserted quickly and easily into testing position. For properly aligning the housing with the work, it is provided with a base plate having opposite parallel edges and the pin is centrally located between the edges to slide at right angles to the base into contact with the work.

To these ends and also to improve generally upon devices of the character indicated, my invention consists in the various matters hereinafter described and claimed.

Referring to the drawings, Figure 1 is a side elevation, partly in section, of the instrument in working position.

Figure 1:
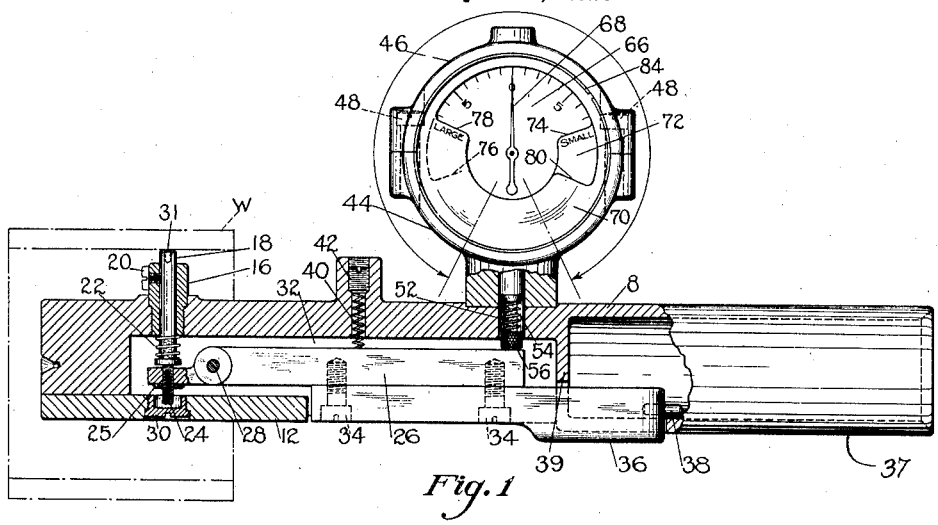
Figure 2:
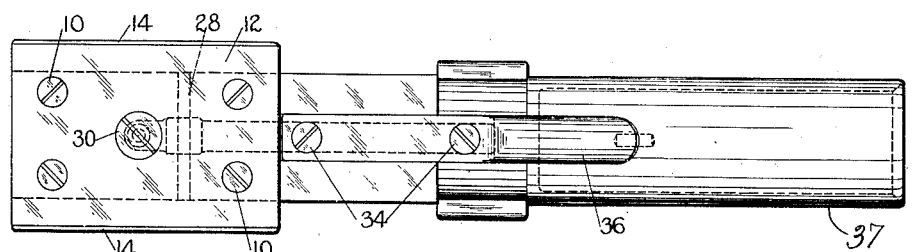
Figure 2 is a bottom plan view.
Figure 3:
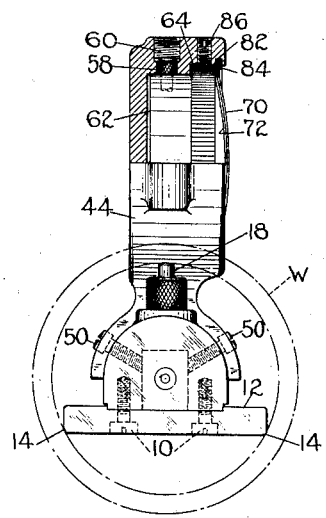
Figure 3 is an end view with parts in section.

In the drawings, W indicates a cylinder or tube the interior of which is to be ground down to the desired diameter. The gauge comprises a housing or support 8, to the underside of which is secured at one end, by screws 10, a base plate 12, the opposite edges 14 of which are parallel and slightly curved (in a vertical plane) to furnish a wide bearing against the work. In the top of the housing is detachably secured a threaded sleeve 16 which furnishes a sliding support or guide for a gauge member or pin 18, a screw 20 passing through the sleeve into a slot of the pin to hold the pin against rotation. The pin has a head at its lower end and between the head and the sleeve is inserted a coil spring 22 for the purpose of withdrawing the pin into the housing when permitted by other devices to be described. The pin is centrally located with respect to the opposite edges 14 of the base plate and slides at right angles to the latter so that the pin always moves on a vertical radius of the tube. The long bearing between the base plate edges 14 and the tube causes the instrument to align itself with the axis of the tube and hence is conducive to accurate gauging. The head of the pin 18 abuts against the end of a screw 24 which is adjustably held by a nut 25 in the short arm of a lever 26 which is pivoted on a horizontal pin 28 in the housing. The screw 24 is accessible through the base plate upon the removal of a threaded plug 30. The screw 24 furnishes a means to compensate for wear on the gauge pin 18 and pivot pin 28 and if desired a diamond 31 may be set in the end of the gauge pin to avoid any appreciable wear at this point.

The lever 26 lies horizontally within a recess 32 in the housing and attached to the under side of it by screws 34 is a trigger 36, the end of which partly overlaps the outer or handle end 37 of the housing. A horizontal stop pin 38 driven into the end of the trigger engages the inner wall of the housing to limit outward movement of the trigger and inward movement is limited by the trigger striking the cross wall 39. When the end of the instrument is to be inserted into a tube or cylinder, grasping of the handle and the trigger in one hand swings the lever 26, and the spring 22 withdraws the pin 18 into the housing sufficiently to enable the instrument to be inserted. When the trigger is released, the gauge pin is forced outwardly, always with the same pressure, into engagement with the work, by means of a comparatively strong spring 40 interposed between the lever and a plug 42 threaded into a boss on the housing.

Near the handle end of the housing is secured an indicator casing 44, the upper half 46 of which is removably attached to the lower half by screws 48. The indicator casing 44 is fastened to the housing 8 by screws 50. An indicator stem 52 slides within the indicator casing and at its lower end has a spring 54 bearing against a knurled head 56 adjustably secured to the indicator stem and abutting against the lever 26. It is apparent that, by the mechanism described, movements of the gauge pin are transmitted to the indicator stem.

Upward movement of the indicator stem is limited by a knurled head 58 carried on the upper end of the indicator stem and arranged to abut against an adjusting plug 60 threaded in a boss at the top of the indicator casing. The space between the head 58 and plug 60 is so adjusted that the indicator needle will have a movement of less than one revolution, preferably about 170° on each side of the zero line of the dial. The needle accordingly will not function if the work piece has been reduced a material amount past the desired dimension and the operator is informed of this fact before continuing to overgrind. The needle is set on its shaft in the proper angular position when the plug 60 is adjusted. The instrumentalities for transmitting movement from the indicator stem to the indicator needle may be of any usual construction and these are housed in a recess 62 of the casing 44. The casing at one side has a circular opening 64 for the reception of the indicator dial 66 with which cooperates an indicator needle 68.

Overlying the dial and the opening 64 are two thin circular plates 70 and 72, the inner plate having a cut away portion extending from the line 74 to the line 76 and the outer one having a similar cut away portion extending from the line 78 to the line 80. The plates can be angularly or rotatably adjusted to uncover more or less of the dial depending upon the amount of "tolerance" which is permissible in the diameter of the piece of work. The exposed part of the dial is only that part which lies between the lines 74 and 78 at the cut away ends of the plates. Thus, so long as the end of the needle is visible it is apparent that the work is of acceptable size and there is no need for the operator to continually watch for a particular reading. The plates are held in a circular recess 82 of the casing by a split spring ring 84 which frictionally engages the casing. The indicator is held in its opening 64 by a set screw 86.

Figure 4:
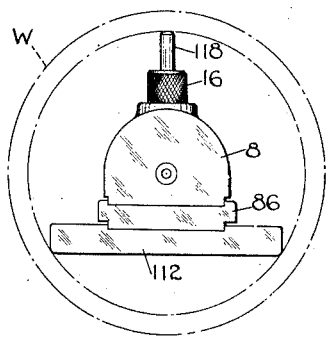
Figure 4 is an end view of the invention adapted for larger work pieces.

In Figure 4, there is shown interposed between a wide base plate 112 and the housing 8 a filler block 86, this being for the purpose of adapting the instrument for tubes or sleeves of large diameter, it being desirable, for the sake of accuracy, to have the edges of the plate and the end of the gauge pin at approximately 120° apart. The gauge pin 118 is longer than the pin 18 which it replaces, the substitution of one pin for another requiring only the removal of the threaded sleeve 16. For only moderately large tubes, it is sufficient to interpose a filler block such as 86 between the base plate 12 and the housing 8, to fasten, by means of the screws 10, a wider base plate such as 112 to the housing 8 without the filler block, to use a longer gauge pin, or to utilize any suitable combination of these features.

Although the invention has been described by reference to a specific apparatus, it should be understood that, in its broader aspects, the invention is not necessarily limited to the embodiment selected for illustrative purposes.

I claim:

1. In an internal diameter gauge for tubes and the like, an elongated housing arranged to be partially inserted in a tube, a base plate fixed near one end of the housing and having opposite parallel edges to align the housing with the tube, a gauge member centrally mounted with respect to the said parallel edges and movable towards and from said base plate, an indicator mounted on the housing, means for transmitting movement from the gauge member to the indicator, and means accessible at the other end of the housing for moving the gauge member towards the base plate when inserting the instrument in gauging position.

2. In an internal diameter gauge for tubes and the like, an elongated housing arranged to be partially inserted in a tube, a rectangular base plate fixed to the hausing and having its opposite edges constructed and arranged to engage the interior surface of the tube to support the housing parallel with the axis of the tube, a gauge pin mounted in the housing to move at right angles to the base plate, an indicator carried by the housing, means for transmitting motion from the gauge pin to the indicator, and a trigger attached to the means and projecting from the housing for moving the pin; substantially as described.

3. In an internal diameter gauge for tubes and the like, a support having a rectangular base the opposite edges of which are arranged to engage the inner surface of the tube to be tested, a gauge pin mounted on the support to slide at right angles to the base, an indicator carried by the support, means for transmitting motion from the gauge pin to the indicator, and means accessible from outside the tube for sliding the gauge pin towards the support when inserting the support in the tube; substantially as described.

4. In an internal diameter gauge for tubes and the like, an elongated support arranged to be partially inserted in a tube, a gauge member mounted near one end of the support and movable relatively thereto towards and from the surface to be tested, an indicator mounted on the support and having a needle, means for transmitting movement from the gauge member to the needle including an indicator stem, and an adjustable member in the path of the stem for limiting the movement of the needle to a portion of a revolution to avoid overgrinding; substantially as described.

5. In a gauge, a support, a gauge pin mounted on the support to slide relatively thereto towards and from the surface to be tested, an indicator mounted on the support and having a needle, means for transmitting movement from the gauge pin to the needle including an indicator stem, and a threaded plug in the path of the stem for variably limiting the movement of the needle; substantially as described.

6. In a gauge, a support, a gauge pin mounted on the support to move relatively thereto towards and from the surface to be tested, an indicator mounted on the support and having a needle and a slidable stem for actuating the needle, means for transmitting movement from the gauge pin to the stem, and an adjustable abutment in the path of the stem to limit the movement of the needle; substantially as described.

7. In a gauge having a movable gauge pin and an indicator needle and dial to indicate the extent of movement of the pin, a plate overlying the dial and having a cut away portion, a second plate overlying the dial and the first mentioned plate and having a similar cut way portion, and means for securing the plates in different angular positions to expose more or less of the dial; substantially as described.

8. In a gauge having an indicator needle and dial, an indicator housing having a circular opening in front of the needle and dial, a thin slotted plate overlying the dial and rotatably fitting the opening to vary the visible portion of the dial, and a split spring ring for holding the plate in position; substantially as described.

9. In an internal diameter gauge for tubes and the like, a support constructed and arranged to be inserted in a tube, a base plate fixed near one end of the support and having opposite parallel edges to align the support with the tube, a gauge member centrally mounted with respect to the said parallel edges and movable towards and from said base plate, an indicator for indicating the position of said gauge member, means operatively connecting said gauge member and said indicator, and a filler block for insertion between the base plate and said support to adapt the instrument for tubes of a larger size; substantially as described.

10. In an internal diameter gauge for tubes and the like, a support constructed and arranged to be inserted in a tube, means for interchangeably securing to said support base plates having opposite parallel edges spaced different distances apart, a gauge member centrally mounted with respect to said parallel edges and movable towards and from said base plate, an indicator for indicating the position of the gauge member, and means operatively connecting said gauge member and said indicator; substantially as described.

11. In an internal diameter gauge for tubes and the like, a support constructed and arranged to be inserted in a tube, means for aligning the support with the axis of the tube, a gauge member centrally mounted with respect to said support and movable relatively thereto along a radius of the tube, a threaded sleeve acting as a guide for said gauge member, said sleeve being detachably screwed to the support and constructed and arranged to receive gauge members of different length, an indicator for indicating the position of the gauge members, and means operatively connecting said gauge member and said indicator; substantially as described.

12. In an internal diameter gauge for tubes and the like, a support constructed and arranged to be inserted in a predetermined position in a tube, a gauge pin slidably mounted in the support to move along a radius of the tube when the support is in the tube in such predetermined position, an indicator, a lever underlying the end of the pin and transmitting its movement to the indicator, and adjustable means interposed between the pin and the lever to compensate for wear; substantially as described.

13. In an internal diameter gauge for tubes and the like, a support constructed and arranged to be inserted in a predetermined position in a tube and having a recess in its under side, a gauge pin slidably mounted in the support to move along a radius of the tube when the support is in the tube in such predetermined position, an indicator carried on said support, a lever pivotally mounted in said recess and transmitting movement from said gauge pin to the indicator, and a trigger fixed to the lever and projecting along the outer end of the support to slide the pin in the support when the instrument is grasped at its outer end; substantially as described.

14. In a gauge for cylindrical objects, a support, a gauge pin slidably mounted in the support to move along a radius of the object when the support is placed in a predetermined relation to said object, an indicator, a lever underlying the end of the pin and transmitting its movement to the indicator, means for moving the lever, and a spring for moving the pin inwardly along a radius of the object upon movement of the lever; substantially as described.

15. In a gauge, a support having means to align itself with the work, a gauge pin slidable in the support at right angles to the work when the support is aligned with the work, a lever pivoted to the frame and having means to operate the gauge pin, a spring for moving the pin in the support upon movement of the lever, an indicator operated by the lever, a trigger for moving the lever, and a second spring engaging the lever for moving the gauge pin outwardly against the work; substantially as described.

In testimony whereof I hereunto affix my signature.

MAX E. BERLOWITZ.